(12) United States Patent
Weinstein et al.

(10) Patent No.: US 6,767,198 B2
(45) Date of Patent: Jul. 27, 2004

(54) ROTARY CUTTER ASSEMBLY

(75) Inventors: James N. Weinstein, Maple Grove, MN (US); Thomas G. Cremers, Green Isle, MN (US); Thomas L. Smith, Greenfield, MN (US)

(73) Assignee: General Mills, Inc., Minneapolis, MN (US)

( * ) Notice: Subject to any disclaimer, the term of this patent is extended or adjusted under 35 U.S.C. 154(b) by 145 days.

(21) Appl. No.: 09/982,125

(22) Filed: Oct. 17, 2001

(65) Prior Publication Data

US 2003/0072835 A1 Apr. 17, 2003

(51) Int. Cl.$^7$ .............................................. A21C 11/00
(52) U.S. Cl. ...................... 425/186; 425/196; 425/313; 425/DIG. 230; 83/592; 83/594; 426/516; 426/518
(58) Field of Search ................................ 425/182, 186, 425/190, 195, 308, 310, 311, 313, 316, 377, 380, 382.2, 404, DIG. 230; 83/592, 594, 675; 426/516, 518; 99/353

(56) References Cited

U.S. PATENT DOCUMENTS

| 363,133 A | 5/1887 | Gavit .......................... 264/312 |
| 896,551 A | 8/1908 | Jurgens ................... 366/149 X |
| 1,946,740 A | 2/1934 | Hall ............................ 425/311 |
| 2,005,996 A | 6/1935 | Kraft ............................ 99/348 |

(List continued on next page.)

FOREIGN PATENT DOCUMENTS

| CH | 587117 | 4/1977 |
| DE | 3029767 | 5/1982 |
| DE | 3243184 | 5/1984 |
| FR | 2601619 | 1/1988 |
| GB | 2070485 | 9/1981 |
| IT | 592409 | 6/1959 |
| JP | 60225726 | 11/1985 |
| JP | 60225728 | 11/1985 |
| NL | 7304519 | 10/1973 |

OTHER PUBLICATIONS

Lihotzky, "Changers Made To Measure", No. 002–02, Sep. 1998 (6 ppages), re European Patent No. 95 109 541.3 (extruders made to measure, 3–seconds–multifunctional screen, die and pelletizing knife changers and tool changer for all extruder systems).

Beringer Self–Lock Screen Changer for processing thermoplastics and other compounds. Beringer, Beringer Way, P.O. Box 485, Marblehead, Mass. 01945, Jan. 1993.

Beringer Ultra–Lock Slide Plate Screen Plate Changer, Beringer, Beringer Way, P.O. Box 485, Marblehead, Mass. 01945–9978, Sep. 1994.

Primary Examiner—Robert Davis
Assistant Examiner—Joseph S. Del Sole
(74) Attorney, Agent, or Firm—John A. O'Toole; Alan D. Kamrath; Douglas J. Taylor

(57) ABSTRACT

A rotary cutter (74) is rotated by a motor (76) through a drive and a belt (326) inside of a combination guard and belt tensioner assembly (260). The rotary cutter (74) includes a cutter head (82) having integral blade holders (92) which slideably receive knives (90) in a channel (230) each having a detent (236) which is received in an aperture (91) in the knife (90) so that no fasteners or moveable parts are provided for holding the knives (90) and adjustment of the knives (90) is not needed or allowed. Guard quarters (266, 314) and a guard half (268) are held in a closed position by a single latch (325). The guard half (268) includes an idler (300) which tensions the belt (326) in the closed position. The second guard quarter (314) mounted upon a pivotable cover (306) together with the mount (262) for the motor (76) defines an enclosure for the rotary cutter (74) and abuts with the guard half (268) in their closed positions.

33 Claims, 3 Drawing Sheets

U.S. PATENT DOCUMENTS

| | | | |
|---|---|---|---|
| 2,078,100 A | 4/1937 | Royle .......................... 425/168 |
| 2,838,084 A | 6/1958 | Samler ..................... 137/15.08 |
| 3,001,485 A | 9/1961 | Czik .......................... 425/183 |
| 3,064,908 A | 11/1962 | Hjelte ................... 366/194 X |
| 3,084,810 A | 4/1963 | Vogel .......................... 429/139 |
| 3,130,468 A | 4/1964 | McFall ....................... 425/183 |
| 3,139,844 A | 7/1964 | Landers ...................... 425/162 |
| 3,299,474 A | 1/1967 | Ashworth, Jr. ................ 425/97 |
| 3,345,854 A | 10/1967 | Gross .......................... 72/263 |
| 3,354,686 A | 11/1967 | Petsch .......................... 72/263 |
| 3,391,565 A | 7/1968 | Linnerz et al. ............... 72/263 |
| 3,543,557 A | 12/1970 | Lomas ......................... 72/263 |
| 3,599,467 A | 8/1971 | Valks .......................... 72/263 |
| 3,739,711 A | 6/1973 | Nielbach ..................... 99/348 |
| 3,834,208 A | 9/1974 | Schmidt ...................... 72/263 |
| 3,893,811 A | 7/1975 | Good et al. ............. 366/149 X |
| 3,947,202 A | 3/1976 | Göller et al. ............ 425/185 |
| 4,048,473 A | 9/1977 | Burkhart .................. 99/331 X |
| 4,251,198 A * | 2/1981 | Altenburg .................... 425/67 |
| 4,395,212 A | 7/1983 | Lambertus .................. 425/185 |
| 4,422,372 A | 12/1983 | Hoezee ........................ 99/353 |
| 4,463,572 A | 8/1984 | Brown, Jr. ................ 62/342 X |
| 4,468,322 A | 8/1984 | Fogarty, Jr. et al. ........ 210/236 |
| 4,569,815 A | 2/1986 | Rentz et al. ................ 264/323 |
| 4,615,894 A | 10/1986 | Ruegg .......................... 26/516 |
| 4,630,533 A | 12/1986 | Schaaf et al. .......... 99/450.7 X |
| 4,652,225 A | 3/1987 | Dehennau et al. ............ 99/353 |
| 4,653,281 A | 3/1987 | Van Der Veer ........... 62/342 X |
| 4,702,608 A | 10/1987 | Garbar et al. ............... 366/146 |
| 4,722,357 A | 2/1988 | Wynosky ................... 137/15.1 |
| 4,722,557 A * | 2/1988 | Bormioli ...................... 285/18 |
| 4,733,607 A | 3/1988 | Star et al. ..................... 99/348 |
| 4,758,097 A | 7/1988 | Iles, Sr. ...................... 366/149 |
| 4,859,165 A | 8/1989 | Hoashi .................... 425/133.1 |
| 4,875,847 A | 10/1989 | Wenger et al. ............ 366/85 X |
| 4,960,043 A | 10/1990 | Van Lengerich ............. 99/353 |
| 4,984,514 A | 1/1991 | Van Lengerich .......... 99/348 X |
| 4,990,022 A | 2/1991 | Watanabe et al. ........... 285/362 |
| 5,013,498 A | 5/1991 | Froeschke ....................... 264/8 |
| 5,190,772 A | 3/1993 | Conselvan et al. ......... 425/184 |
| 5,329,842 A | 7/1994 | Zittel .......................... 99/348 |
| 5,333,538 A | 8/1994 | Sawa .................. 425/131.1 X |
| 5,403,603 A | 4/1995 | McCullough et al. ....... 426/233 |
| 5,427,015 A | 6/1995 | Zittel .......................... 99/348 |
| 5,433,490 A | 7/1995 | Hurd et al. .................. 285/360 |
| 5,435,236 A | 7/1995 | Weinstein et al. ............ 99/353 |
| 5,525,052 A | 6/1996 | Czarnetzki et al. ......... 425/183 |
| 5,577,437 A | 11/1996 | Hurd .......................... 99/549 |
| 5,624,688 A * | 4/1997 | Adams et al. ................ 425/67 |
| 5,665,402 A | 9/1997 | Czarnetzki et al. ......... 425/183 |
| 5,762,975 A | 6/1998 | Rockstedt .................... 425/186 |
| 5,776,534 A | 7/1998 | Christensen et al. ........ 426/516 |
| 5,919,509 A | 7/1999 | Cremers et al. ............. 426/516 |
| 6,105,260 A * | 8/2000 | Parrish et al. ................. 30/331 |
| 6,152,021 A | 11/2000 | Weinstein et al. ............ 99/353 |
| 6,167,798 B1 | 1/2001 | Weinstein et al. ............ 99/353 |
| 6,189,439 B1 | 2/2001 | Weinstein .................... 99/353 |

* cited by examiner

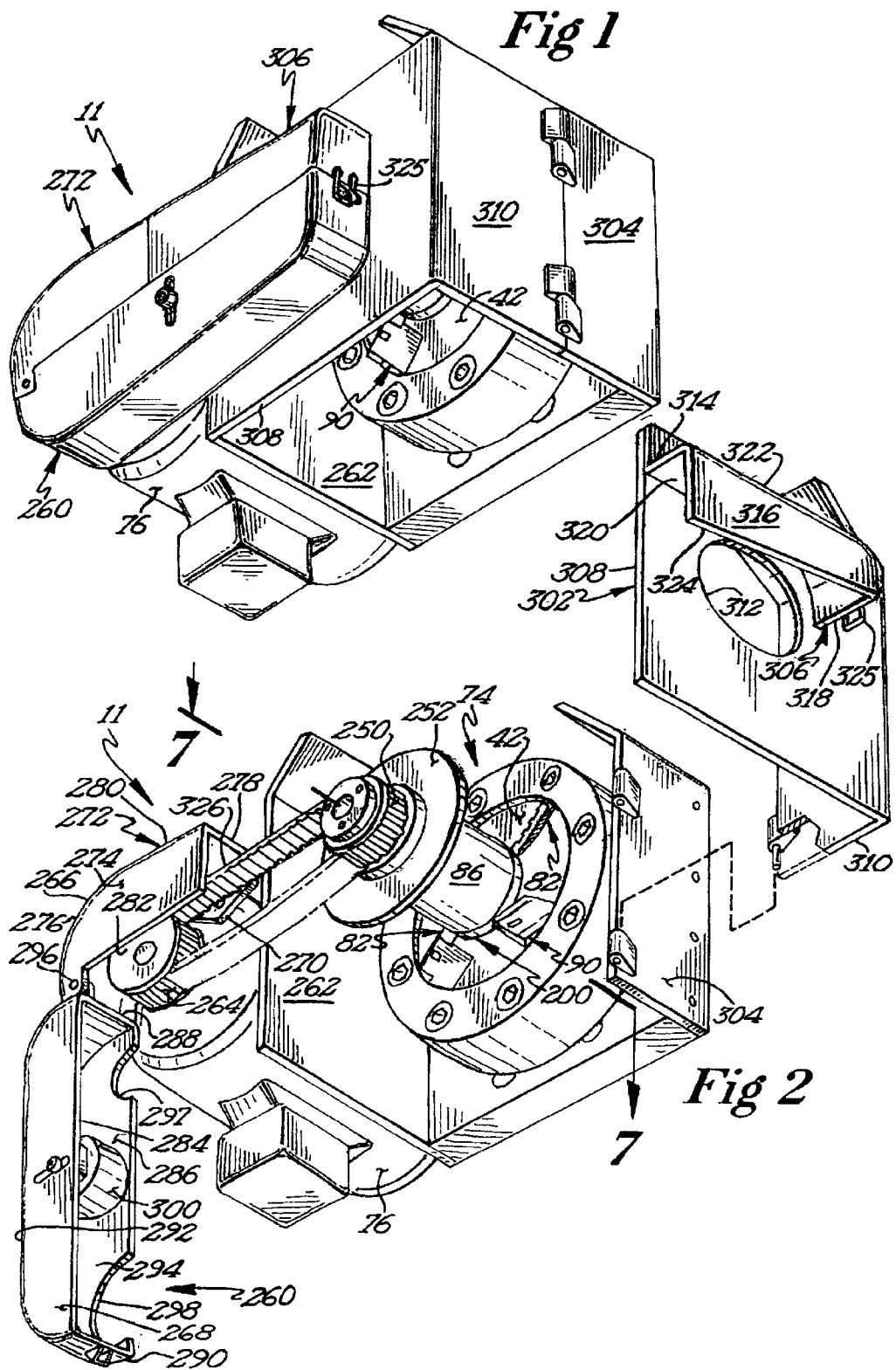

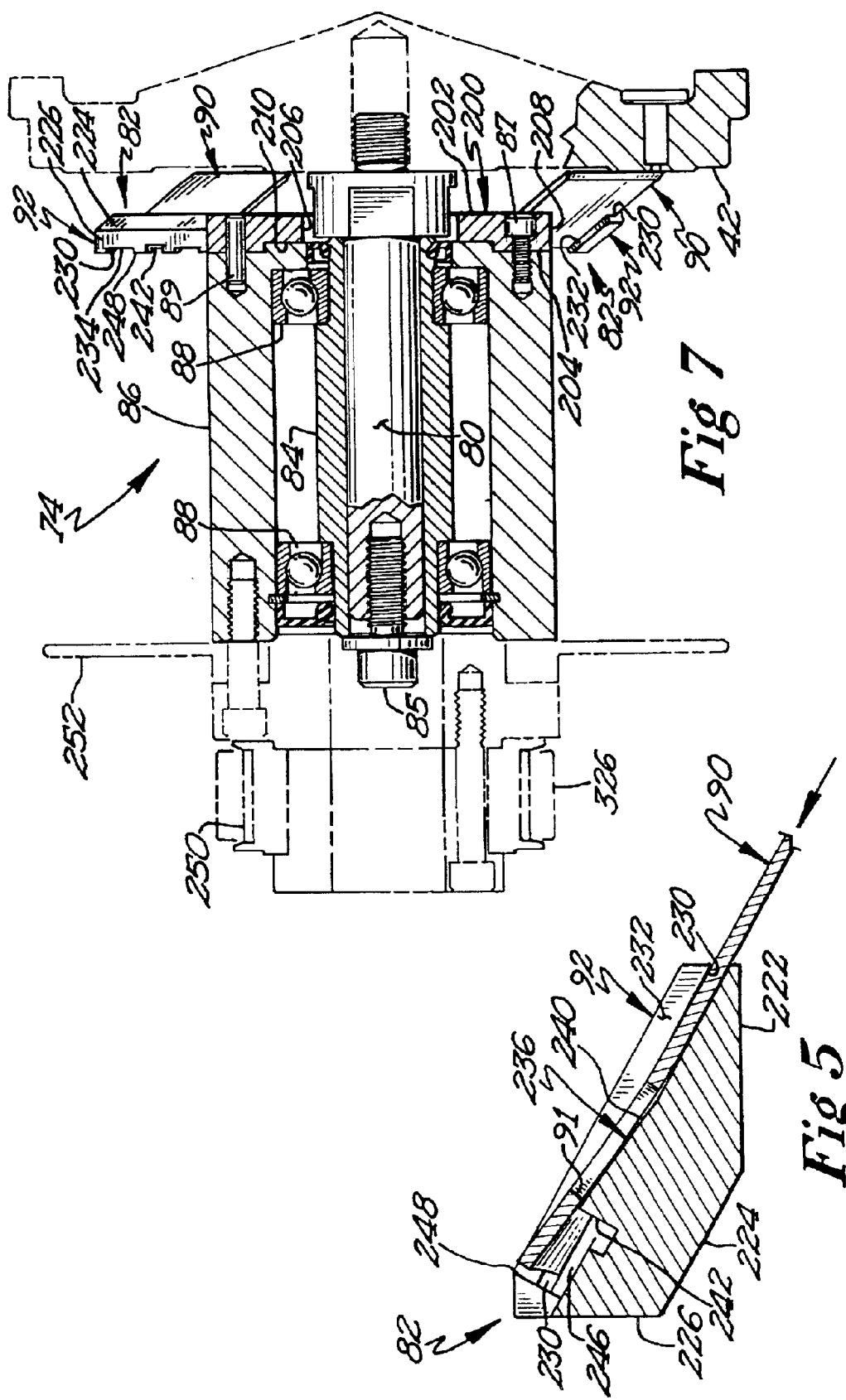

ROTARY CUTTER ASSEMBLY

BACKGROUND OF THE INVENTION

The present invention generally relates to assemblies useable in the field of rotary cutting, particularly to easily removable guards performing multiple functions and to rotary cutters, which are believed to produce synergistic results when utilized together.

The production of many food products involves the extrusion of cooked food material under pressure through a die port as an extrudate and then to cut that extrudate into lengths as it exits the die ports in the die. A common technique for cutting the extrudate is the use of a rotary cutter which rotates multiple blades past die ports located in a circular pattern in the die. It can be appreciated that the blades are subject to wear and need replacement. In this regard, rotary cutters are often serviced or at least inspected whenever it is necessary to service the die.

It can be appreciated that safety guards are needed to enclose the rotary cutter and drive therefor to prevent engagement by personnel or clothing as well as to retain the cut food products in an uncontaminated environment and to prevent engagement of the cut food products with the drive. However, it should be appreciated that such guards must allow access when it is desired to service the rotary cutter and/or die. Prior to the present invention, such guards often required removal of several fasteners and often components themselves. Also, components for such prior guards accomplished only single functions, adding complexity to the assembly.

Servicing the rotary cutter itself also created problems. Particularly, blades of the rotary cutter were held on the blade holders by a clamp plate typically with two or more fasteners. Additionally, the blades and/or blade holders were adjustable so that the cutting angle relative to the die face could be adjusted for optimum operation. However, removing or loosening fasteners was time consuming and added to the overall complexity of the rotary cutter itself. Furthermore, adjusting the blades is a time consuming process even for a skilled operator. Additionally, if not adjusted properly, the blades can cut poorly resulting in defective food products and/or can result in increased wear, breakage, or other damage to the face of the die and/or to the blades themselves. As an example, an incorrect angle of the blade could be compensated by increasing the engagement pressure of the blade with the die, with frictional forces and wear being directly dependent upon the engagement pressure. In addition to increased operating costs as the result of shortened operating life of the components themselves, concerns arise of metal filings and/or pieces being introduced with the food product.

Thus, a need exists for improved rotary cutters which overcome the deficiencies of prior rotary cutters including but not limited to the need for adjustment and fasteners. Additionally, a need exists for improved assemblies which overcome the deficiencies of prior guards including but not limited to complexity, lack of easy access and single function components.

SUMMARY OF THE INVENTION

The present invention solves these needs and other problems in the field of assemblies useable in the field of rotary cutting by providing, in the preferred form, a rotary cutter having a knife support surface of a blade holder integrally formed with the cutter head such that the angle of the knife support surface and the knife removably attached thereto in a single, nonvariable and nonadjustable potential position can not be varied relative to the rotation axis of the cutter head.

In further aspects of the present invention, the knife which is restrained to slide along a single slide direction on and parallel to a knife support surface is prevented from sliding in the single slide direction by a detent received in an aperture included in the knife most preferably spaced from the edges of the knife.

In still other aspects of the present invention, first and second guard quarters and a guard half are provided with the second guard quarter being moveable between a guard position and an access position and with the guard half being moveable between a closed position and an open position. The second guard quarter is prevented from moving from the guard position when the second guard half is in the closed position. Access is prevented to drive elements such as for a motor and a rotary cutter in the guard and closed positions.

In other aspects of the present invention, a guard receiving the rotatably interconnecting assemblage of a drive prevents a cover from pivoting from an enclosure position while in a guard position and is pivotable to an open position allowing the cover to pivot from the enclosure position to an access position. In the enclosure position, an enclosure is defined for a second element rotatable about an axis. In the access position, access is allowed to the second element.

It is thus an object of the present invention to provide a novel rotary cutter where the blades are held in correct positions and which remove the ability to manually adjust the blades.

It is further an object of the present invention to provide a novel rotary cutter where the blades can be easily and quickly replaced by relatively unskilled personnel.

It is further an object of the present invention to provide such a novel rotary cutter where the blades are held without the use of fasteners, clamp plates or similar moveable and/or removable components.

It is further an object of the present invention to provide such a novel rotary cutter of a simple construction reducing fabrication and assembly costs.

It is thus an object of the present invention to provide a novel assembly for enclosing a drive.

It is further an object of the present invention to provide such a novel drive enclosing assembly including components performing multiple functions.

It is further an object of the present invention to provide such a novel drive enclosing assembly which can be easily and quickly opened to provide access when desired.

It is further an object of the present invention to provide such a novel drive enclosing assembly having interlocking components requiring moving of components before other components can be moved.

These and other objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 1 shows a perspective view of a rotary cutter assembly fabricated in accordance with the preferred teachings of the present invention and in an operating condition.

FIG. 2 shows an exploded perspective view of the rotary cutter assembly of FIG. 1 in a servicing condition.

FIG. 5 shows a cross sectional view of the rotary cutter assembly of FIG. 1 similar to FIG. 4 but showing the knife in the process of being removed.

FIG. 7 shows a cross sectional view of the rotary cutter assembly of FIG. 1 according to section line 7—7 of FIG. 2.

Figure 3:
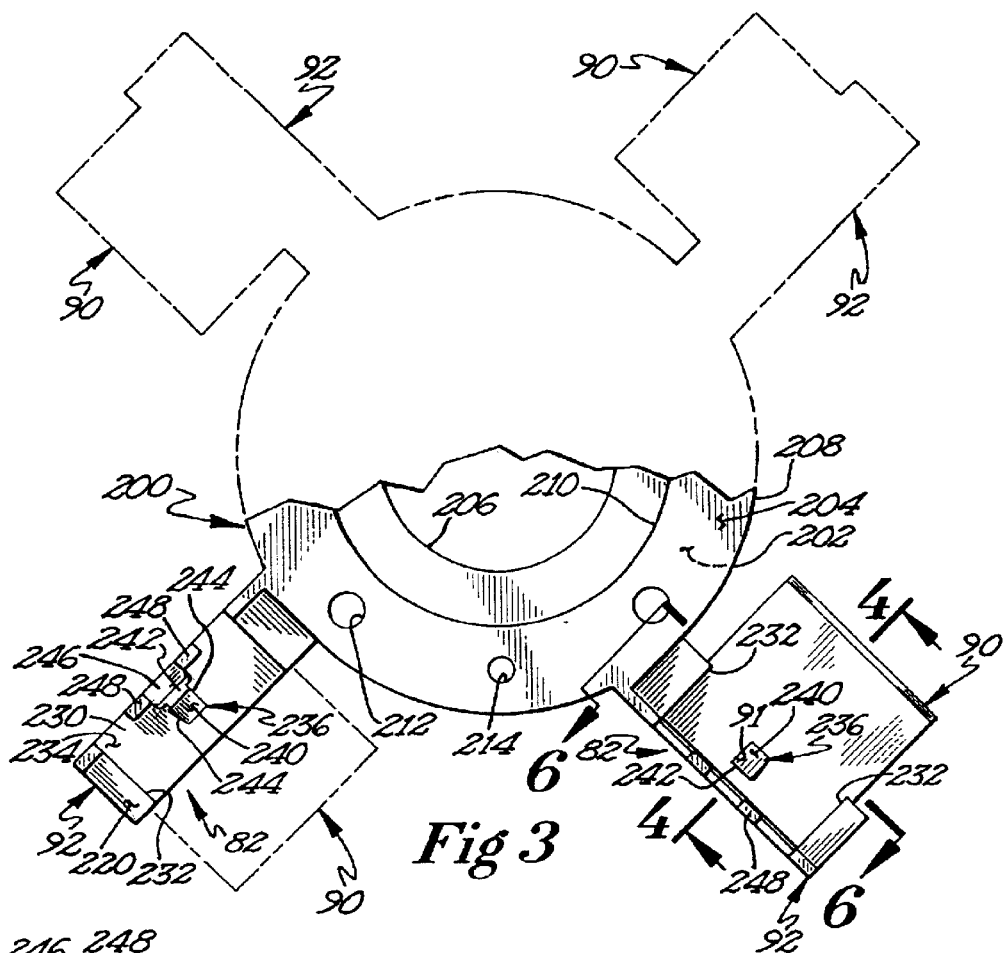
FIG. 3 shows a top plan view of a cutter head of the rotary cutter assembly of FIG. 1, with portions being shown in phantom.
Figure 4:
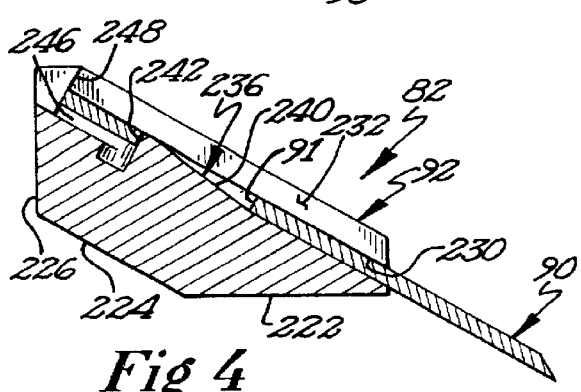
FIG. 4 shows a cross sectional view of the rotary cutter assembly of FIG. 1 according to section line 4—4 of FIG. 3.
Figure 6:
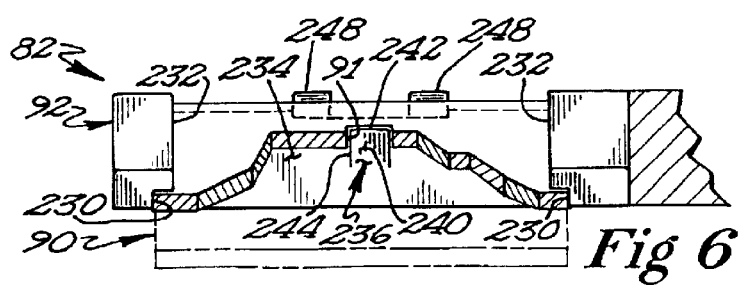
FIG. 6 shows a cross sectional view of the rotary cutter assembly of FIG. 1 according to section line 6—6 of FIG. 3.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "axial", "radial", "second", "side", "end", "inner", "outer", "inside", "outside", and similar terms are used herein, it should be understood that these terms have reference only to the structure shown in the drawings as it would appear to a person viewing the drawings and are utilized only to facilitate describing the preferred embodiment.

DETAILED DESCRIPTION OF THE PREFERRED EMBODIMENT

A rotary cutter assembly according to the preferred teachings of the present invention is shown in the drawings and generally designated 11. Assembly 11 generally includes a rotary cutter 74 which is rotatably mounted relative to a die 42 for a cooker/extruder. It can be appreciated that the cooker/extruder can be of any desired configuration including but not limited to of the type shown in U.S. Pat. Nos. 5,577,437; 5,776,534 or 5,919,509, each of which are incorporated herein by reference. Die 42 can be suitably secured to the cooker/extruder and may include provisions for allowing easy change of the die and/or rotary cutter such as but not limited to by including mechanisms of the type shown in U.S. Pat. Nos. 5,433,490; 5,577,437; 6,152,021; 6,167,798 and/or 6,189,439, each of which are incorporated herein by reference.

In the most preferred form, each rotary cutter 74 includes a center shaft 80 extending axially from die 42 and defining the rotation axis of rotary cutter 74. As an example, shaft 80 could be threadably received in die 42, could extend through die 42 and be axially fixed thereto such as by a snap ring or by being threadably received in a nut, or the like. In the most preferred form, a bearing spacer or hub 84 is suitably fixed on center shaft 80 such as by a bolt 85 or the like threadably received in the free end of center shaft 80 and sandwiching hub 84 against an enlarged portion of center shaft 80. A cylindrical mount 86 is rotatably mounted to hub 84 by suitable provisions 88 such as first and second roller bearings as shown and located and axially fixed between hub 84 and cylindrical mount 86. A cutter head 82 is suitably secured in a nonrotatable manner to the upstream face of mount 86 such as by socket head cap screws 87 and dowel pins 89. Thus, cutter head 82 is rotated about the axis defined by center shaft 80 relative to die 42. A plurality of radially extending knives 90 abut and slide on the downstream face of die 42 and cut the food exiting die 42 into axial lengths.

Knives 90 are removably mounted to cutter head 82. In the preferred form, knives 90 are planar of a generally rectangular shape. The front edges of knives 90 are ground to a cutting profile for engaging and sliding on the downstream face of die 42. Knives 90 are formed of tempered and polished spring steel in the preferred form and have an inherent resiliency. Each knife 90 includes an aperture 91 closely adjacent but spaced from the rear edge, intermediate the side edges, and spaced from the front edge.

In a preferred form, cutter head 82 is formed by an annular plate 200 having an upstream face 202, a downstream face 204, a center opening 206, and a generally circular periphery 208. Center shaft 80 passes through opening 206 in a noninterfering manner. Downstream face 204 includes a counter bore 210 for receiving a pilot shoulder formed on cylindrical mount 86. Counter bores 212 extend between faces 202 and 204 for slideably receiving screws 87 with the heads of screws 87 being recessed below face 202. Bores 214 extend between faces 202 and 204 for receiving dowel pins 89. Blade holders 92 are integrally formed with plate 200 and extend radially from cutter head 82 and beyond periphery 208, with each blade holder 92 removably holding a single knife 90 at a single, nonvariable and nonadjustable potential position.

In the most preferred form, blade holders 92 have generally trapezoidal cross sections perpendicular to the radial direction. Specifically, blade holders 92 include a major base 220 extending at an acute angle in the order of 30° to faces 202 and 204 and the axial direction. Blade holders 92 include a first side 222 extending at the acute angle of the major base 220 and in the most preferred form is coplanar with upstream face 202. A minor base 224 extends at an obtuse angle in the order of 150° to side 222 and generally parallel to major base 220. A second side 226 extends at an obtuse angle in the order of 130° relative to minor base 224 and at an acute angle in the order of 50° to major base 220. In the most preferred form, the interconnections between major base 220 and sides 222 and 226 are each chamfered.

A channel 230 extends from major base 220 between sides 222 and 226 at a constant depth, spaced from the radial ends of blade holders 92 and of a width generally equal to the width of an individual knife 90 and for slideable receipt of knife 90. In particular, the bottom 234 of channel 230 defines a knife support surface while the opposite edges of channel 230 restrain the individual knife 90 to slide along a single slide direction parallel to and on the knife support surface defined by bottom 234 of channel 230. The single slide direction and the knife support surface extend in a plane intersecting with the axis of rotary cutter 74 at an angle other than perpendicular and particularly at the acute angle of major base 220. Shoulders 232 extend from the opposite edges of channel 230 spaced from bottom 234 of channel 230 at a distance generally equal to the thickness of an individual knife 90 and for slideable receipt of knife 90 parallel to the knife support surface defined by bottom 234. In the most preferred form, shoulders 232 have an outer surface coextensive with major base 220.

One or more detents 236 are provided in channel 230 for holding knife 90 in channel 230. In the most preferred form, detent 236 is integrally formed as a single component with the knife support surface defined by bottom 234 and blade holder 92. Specifically, detent 236 includes an incline surface 240 extending at a very small acute angle in the order of 8° from bottom 234 away from side 222. Surface 240 terminates in a stop surface 242 extending generally perpendicular to bottom 234, with stop surface 242 having a height above bottom 234 generally equal to the thickness of knife 90. The sides 244 of detent 236 can have any desired configuration such as planar extending generally perpendicular to bottom 234. In the preferred form, a groove 246 extends from bottom 234 from side 226 to stop surface 242 and in the most preferred form of a width generally equal to and preferably slightly wider than stop surface 242. A blade backstop 248 shown as first and second projections on radially opposite sides of detent 236 extends from side 226 and above bottom 234, with backstop 248 having an outer surface coextensive with major base 220 in the most preferred form.

Apertures 91 are of a size and position in knives 90 for slideable receipt of detents 236. In particular, to install knife 90, knife 90 is positioned to slide on bottom 234 in channel 230 below shoulders 232. Knife 90 can been be slid in the single slide direction into channel 230 with the lower surface abutting with bottom 234 defining the knife support surface until the rear edge of knife 90 engages incline surface 240. The rear edge will ride up on incline surface 240 until aperture 91 aligns with detent 236 at which time knife 90 will return to a planar condition due to the resiliency of knife 90. Thus, knife 90 is held from moving in a radial direction by abutment with the opposite edges of channel 230, is held from moving in a direction perpendicular to bottom 234 by abutment with shoulders 232 and bottom 234, is held from moving in a first direction parallel to bottom 234 and perpendicular to the radial direction further into channel 230 by abutment of the rear edge of knife 90 with backstop 248 and is held from moving in the opposite direction by abutment of the stop surface 242 with aperture 91. Thus, knife 90 is removably attached to blade holder 92, abuts with the knife support surface defined by bottom 234, and is held at the angle of the knife support surface.

Knife 90 can be removed from blade holders 92 by inserting a tip of a screwdriver or similar tool into groove 246 and beneath knife 90. The tool can be pushed or pried to flex knife 90 until the lower surface of knife 90 adjacent detent 236 is spaced greater than stop surface 240 from bottom 234 such that knife 90 can be slid from channel 230. It can be appreciated that the resiliency of knife 90 allows knife 90 to flex sufficiently to allow removal of detent 236 from aperture 91.

It should be appreciated that blade holders 92 allow the installation and removal of knives 90 without requiring any screws, fasteners or the like to be loosened or removed. Specifically, knives 90 are simply slid and snapped into place without the use of screws, fasteners or clamps, with the resiliency of knives 90 themselves being utilized to help hold them in place. Thus, installation and removal can be easily and quickly accomplished without any specialized tools and without considerable skill or expertise. As cutter head 82 is formed as a single component with no moving or flexible parts, rotary cutter 74 can be quickly assembled and manufactured from a few parts, and cutter head 82 is not subject to breakage or other deterioration due to age or use.

Additionally, it can be appreciated that blade holders 92 and cutter head 82 integrally formed as a single component provide advantages in holding knives 90 at the correct orientation to increase cutting efficiency while reducing wear and in doing so to minimize the servicing time and difficulty. Specifically, blade holders 92 can be machined precisely enough so that knives 90 engage die 42 at the correct angle to provide high quality cuts and to reduce the tendency to damage the face of die 42 or the tendency of excessive wear to knives 90. Specifically, blade holders 92 can not be varied and do not require adjustment relative to die 42 due to their integral formation and in this regard in fact prevent adjustment especially by relatively unskilled operators. Particularly, channels 230 can be accurately machined relative to the axis of cutter head 82, and dowel pins 89 accurately position cutter head 82 relative to cylindrical mount 86 and thus to center shaft 80 and die 42. Additionally, blade holders 92 only allow attachment of knives 90 at the single, nonvariable and nonadjustable, potential position. In particular, it is not possible for knives 90 to be attached to blade holders 92 at any other position moved in any direction parallel or perpendicular to knives 90 except in the single, potential position. Prior clamping type blade holders allowed the knives to be canted or otherwise adjusted relative to the blade holders. According to the preferred teachings of the present invention, it is not possible for anyone including skilled operators and especially unskilled operators to position knives 90 at any other position than the specifically machined and designed single, potential position.

Suitable provisions are provided to rotate rotary cutter 74 about its axis. In the preferred form, rotary cutter 74 is belt-driven by a motor 76. In particular, a toothed pulley 250 is suitably secured to cylindrical mount 86 by any conventional approach. In the most preferred form, a circular plate 252 is axially positioned between pulley 250 and cylindrical mount 86 and extends generally radially from the axis defined by center shaft 80 to an extent considerably larger than pulley 250 and cylindrical mount 86.

According to the preferred teachings of the present invention, rotary cutter assembly 11 includes a combination guard and belt tensioner assembly 260. In particular, a generally planar motor mount 262 is suitably secured to the cooker/extruder and positioned spaced from and generally tangentially to die 42, rotary cutter 74 and the axis defined by center shaft 80, with motor mount 262 being arranged vertically in the preferred form. Motor mount 262 extends axially greater than circular plate 252 and less than pulley 250. Additionally, motor mount 262 has an extent tangential to die 42 generally equal to and particularly slightly larger than die 42. Motor mount 262 can be shaped to accommodate other components associated with the cooker/extruder or with the production of food products such as an angled flange. Motor 76 is suitably mounted to motor mount 262 such as by dowel pins and/or bolts. Motor 76 includes a pulley 264 mounted to its shaft rotatable about an axis generally parallel to and spaced from the axis of rotary cutter 74 defined by center shaft 80.

Assembly 260 includes a first guard quarter 266 and a guard half 268 with guard quarter 266 being stationary with respect to motor 76 and guard half 268 being moveable relative to motor 76 and in the most preferred form pivotal relative to motor 76 and guard quarter 266 about an axis parallel to and spaced from the axes of motor 76 and rotary cutter 74. Guard quarter 266 includes an arcuate bracket 270 suitably secured to motor 76 in the preferred form, but it could be secured in a stationary manner relative to motor 76 in other manners including but not limited to being secured to motor mount 262, the cooker/extruder, or the like. Bracket 270 is positioned axially intermediate motor 76 and pulley 264 and generally at the axial extent but slightly greater than motor mount 262. Bracket 270 arches around and generally straddles the motor shaft and pulley 264.

Guard quarter 266 further includes an enclosure 272 having a generally planar top 274, a closed first end 276 generally on the opposite side of pulley 264 than motor mount 262, a second open end 278 intermediate pulley 264 and motor mount 262, a closed first side 280 and an open second side 282. The lower edges of end 276 and side 280 are secured to bracket 270 such as by bolts, with end 276 and side 280 having a generally arcuate shape. Open end 278 and the end edges of bracket 270, top 274, and side 280 generally correspond to and are generally coplanar with motor mount 262. Thus, guard quarter 266 receives a portion of pulley 264 and is spaced from pulley 250.

Guard half 268 is generally parallelepiped in shape having a closed top 284, a closed bottom 286, a closed first end 288, a closed second end 290, a closed side 292 and an open side 294. Side 294 is positioned intermediate pulley 264 and closed side 292. Guard half 268 is pivotably mounted to and moveable relative to guard quarter 266 such as by a pivotal joint 296 about an axis parallel to and spaced from the axes of rotary cutter 74 and motor 76 between an open position and a closed position. The edges of tops 274 and 284 and of bracket 270 and bottom 286 abut, and ends 276 and 288 are coextensive in the closed position in the preferred form shown. Bottom 286 includes a first cutout 297 which corresponds to the arcuate shape of bracket 270 for receiving pulley 264 and/or the motor shaft of motor 76 when quarter 266 and half 268 are in a closed position. Guard half 268 has a length greater than quarter 266 and extends beyond pulley 250 in the closed position. Bottom 286 further includes a second cutout 298 for receiving generally one-half of pulley 250 in the closed position. An idler 300 is rotatably mounted between top 284 and bottom 286 and extends outward of half 268 beyond open side 294. In the most preferred form, idler 300 is adjustably mounted such as by the use of lost motion slots so that the extent of idler 300 outward of half 268 can be adjusted. Guard half 268 receives a portion (remaining from guard quarter 266) of pulley 264 and a portion of pulley 250 in the closed position and allows access to pulleys 250 and 264 in its open position.

Assembly 260 further includes a housing 302. In particular and in the preferred form shown, a hinge mount 304 is suitably secured to the cooker/extruder and positioned generally parallel to motor mount 262 and on the opposite side of rotary cutter 74. A cover 306 of a generally L shape includes a first wall 308 having a lower edge pivotally mounted to the upper edge of hinge mount 304 and a second wall 310 extending generally perpendicular to first wall 308. Cover 306 is pivotal relative to hinge mount 304 about an axis which is perpendicular to the axes of motor 76, rotary cutter 74 and guard half 268 between a closed, enclosure, or guard position and an open or access position. In the closed position, first wall 308 is coplanar with hinge mount 304 and parallel to and spaced from motor mount 262 and the second wall 310 is generally parallel to and spaced from die 42 and having its free edge resting upon the upper edge of motor mount 262. In the open position, first wall 308 is generally perpendicular to hinge mount 304 and extends away from motor mount 262 and with wall 310 extending generally parallel to motor mount 262 and hinge mount 304. Thus, in the access position, wall 310 is spaced from mount 262 to allow access to rotary cutter 74.

Wall 310 includes an opening 312 through which pulley 250 extends when cover 306 is in its closed position. In the most preferred form, opening 312 is oval shape having a major axis perpendicular to the hinge axis between cover 306 and hinge mount 304 to minimize the size of opening 312 while still allowing pivotal movement of cover 306 relative to rotary cutter 74. Plate 252 has a size larger than opening 312, with wall 310 of cover 306 located intermediate plate 252 and pulley 250 in the closed position of cover 306.

Housing 302 further includes a receptacle or second guard quarter 314 secured to and moveable with cover 306 relative to rotary cutter 74 and to guard half 268. Guard quarter 314 includes a closed top 316, a first closed end 318 on the opposite side of pulley 250 than motor mount 262 in the closed position, a second open end 320, a closed side 322, and an open side 324, with the bottom of quarter 314 being formed and defined by wall 310. In the closed position, guard quarter 314 receives a portion of pulley 250 and is spaced from pulley 264 while in the open position is spaced from pulley 250. In the closed position of guard half 268 and cover 306, open side 324 is coextensive with open side 294, top 316 is coextensive with tops 274 and 284, and closed end 318 is generally coextensive with end 290. A suitable securing mechanism such as a latch 325 between ends 290 and 318 can be provided to removably secure guard half 268 to guard quarter 314. A continuous, flaccid member such as a belt 326 shown as a timing belt extends around and between pulleys 250 and 264 and which is engaged by idler 300 when cover 306 and guard half 268 are in the closed position.

In the closed positions, guard quarters 266 and 314 and guard half 268 receive and enclose pulleys 250 and 264 and timing belt 326 and generally prevent access by personnel, clothing and the like to pulleys 250 and 264 and timing belt 326. Specifically, pulley 264 and the C-shaped portion of belt 326 on the same side of motor mount 262 as pulley 264 are received by first guard quarter 266 and guard half 268. Additionally, pulley 250 and the C-shaped portion of belt 326 on the same side of motor mount 262 as pulley 250 are received by second guard quarter 314 and guard half 268. Additionally, motor mount 262, walls 308 and 310, and hinge mount 304 define an enclosure for rotary cutter 74 to thereby retain the food products cut by knives 90 in an uncontaminated environment and to prevent engagement of the cut food products with the drive comprising pulley 250 and belt 326. In this regard, circular plate 252 acts as a slinger to prevent exiting of the cut food products through opening 312. Thus, assembly 260 functions as both the guard for the drive including pulleys 250 and 264 and belt 326 but also defines the enclosure for the food products around rotary cutter 74. Additionally, the engagement of idler 300 tensions belt 326 around pulleys 250 and 264. It should be appreciated that tension on belt 326 by idler 300 can be adjusted by utilizing an adjustable latch 325, by moving idler 300 relative to guard half 268, or by other means. Additionally, it should be appreciated that guard half 268 in its closed position extends over, abuts with and prevents pivoting of cover 306 and guard quarter 314 about its axis from its closed position to its open position unless securement by latch 326 is released and guard half 268 is moved from its closed position to a noninterfering position relative to cover 306.

If access is desired, latch 325 can be released to allow guard half 268 to be pivoted from its closed position to its access position. In the preferred form, latch 325 is of the type which can be opened without the use of tools such as but not limited to an overcenter type. Once guard half 268 is moved from its closed position, idler 300 is removed from belt 326 so that it is no longer under tension. Thus, it can be appreciated that assembly 260 performs multiple functions as it performs as a guard and also as a belt tensioner. With guard half 268 in its open position and the tension on belt 326 removed, belt 326 can be removed from pulleys 250 and 264. After belt 326 is removed, cover 306 can be pivoted from its closed position to its open position. It should be appreciated that cover 306 can be moved without the use of tools. Additionally, in the open position, wall 310 is parallel to motor mount 262 at a spacing greater than the diametric extent of die 42 and specifically by the height of wall 308 to maximize the space for servicing rotary cutter 74 and/or die 42. It should be appreciated that all components of assembly 260 remain secured relative to the cooker/extruder and are not removed so that the risk of misplacement is eliminated. Additionally, it is only necessary to release the single latch 325 with all of the other components being secured by the interfitting relation of guard half 268 therewith.

After die 42 and/or rotary cutter 74 has been serviced or replaced, assembly 260 can be moved to its closed position by simply reversing the procedure for moving to its open position.

Now that the basic teachings of the present invention have been explained, many extensions and variations will be obvious to one having ordinary skill in the art. For example, although apparatus 11 of the most preferred form includes the combination of several unique features believed to obtain synergistic results, apparatus could be constructed according to the teachings of the present invention including such features singly or in other combinations. Specifically, rotary cutters 74 could be driven in other manners including but not limited to the types shown in U.S. Pat. No. 6,189,439 including provisions for sliding motor 76 and removably coupling motor 76 to rotary cutter 74 or by utilizing stationary shaft motors. Similarly, although assembly 260 in the preferred form is for a drive including a first element in the form of motor 76 and a second element in the form of rotary cutter 74, assembly 260 could be utilized in connection with other types of drives having first and second elements of differing types. Likewise, rotary cutter 74 and assembly 260 each includes a combination of unique features believed to obtain synergistic results. Such features may have application according to the teachings of the present invention in other types and constructions of rotary cutters 74 or assemblies 260. Other constructions may be contemplated according to the teachings of the present invention.

Likewise, although guard quarter 266 is shown as being unmovable relative to the first element shown as motor 76 in the preferred form, guard quarter 266 could also be moveable relative thereto as long as it is fixed when second guard quarter 314 and guard half 268 are in their closed positions.

Further, although shown as being solid in the preferred form, guard quarters 266 and/or 314 and/or guard half 268 could be completely or partially formed of screen or similar constructions which can allow observation and passage of air but which is closed to passage of personnel, clothing and like objects.

Furthermore, although in the preferred form motor 76 and rotary cutter 74 are rotatably interconnected by pulleys 250 and 264 fixed relative thereto and utilizing belt 326, assemblages of other types and variations can be utilized for rotatably interconnecting rotary cutter 74 and motor 76 according to the teachings of the present invention. Additionally, the guard for such rotatably interconnected assemblages can be varied from the type shown in the preferred form according to the teachings of the present invention including but not limited to guards which keep the assemblage in a sealed environment where vacuum conveyers are utilized for the cut food products.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A rotary cutter for a die comprising, in combination: a cutter head adapted to be rotate about an axis relative to the die, with the cutter head including a periphery; at least a first blade holder extending radially from the cutter head beyond the periphery, with the lade holder including a knife support surface extending in a plane intersecting with the axis at an angle other than perpendicular; and a knife removably attached to the blade holder at a single, nonvariable and nonadjustable potential position, with the knife in the single, nonvariable and nonadjustable potential position abutting with the knife support surface and being held at the angle of the knife support surface, with the blade holder and the cutter head being integrally formed as a single component such that the angle of the knife support surface an the knife attached to the blade holder can not be varied relative to the axis, with the knife including an aperture, with the blade holder including a detent for receipt in the aperture for selectively preventing sliding of the knife parallel to the support surface, and with the detent being integrally formed as a single component with the knife support surface.

2. The rotary cutter of claim 1 further comprising, in combination: shoulders extending from opposite edges of the knife support surface and spaced from the knife support surface for slideable receipt of the knife parallel to the knife support surface.

3. The rotary cutter of claim 2 with the knife including a cutting edge, a rear edge, and first and second side edges, with the aperture being spaced from the cutting, rear, and side edges.

4. The rotary cutter of claim 3 with the detent including an inclined surface extending at a small acute angle to the knife support surface terminating in a stop surface extending generally perpendicular to the knife support surface.

5. The rotary cutter of claim 4 further comprising, in combination: a groove formed in one of the knife and the knife support surface, with the knife being flexible to remove the detent from the aperture by receipt of a tool in the groove and between the knife and the knife support surface to flex the knife to remove the detent from the aperture.

6. The rotary cutter of claim 1 with the knife being restrained to slide along a single slide direction parallel to the knife support surface, with the knife including an aperture; and with the blade holder including a detent for receipt in the aperture for selectively preventing sliding of the knife parallel to the support surface along the single slide direction.

7. The rotary cutter of claim 6 further comprising, in combination: a groove formed in one of the knife and the knife support surface adapted to receive a tool between the knife and the knife support surface to flex the knife to remove the detent from the aperture.

8. The rotary cutter of claim 7 with the detent being integrally formed as a single component with the knife support surface, with the detent including an inclined surface extending at a small acute angle to the knife support surface terminating in a stop surface extending generally perpendicular to the knife support surface.

9. The rotary cutter of claim 8 with the knife including a cutting edge, a rear edge, and first and second side edges, with the aperture being spaced from the cutting, rear, and side edges.

10. The rotary cutter of claim 1 further comprising, in combination: a first element rotatable about a first axis and including a first pulley, a second pulley included on the cutter ad, with the axis of the cutter head being a second axis; a continuous, flaccid member extending between the first and second pulleys, with the first and second axes being in a spaced parallel relation; a first guard quarter; a second guard quarter; and a guard half, with the first guard quarter being fixed relative to the first element and receiving a portion of the first pulley and being spaced from the second pulley, with the second guard quarter being movable relative to the cutter head between a guard position receiving a portion of the second pulley and spaced from the first pulley and an access position being spaced from the second pulley, with the guard half being movable relative to the first and second guard quarters between a closed position receiving a remaining portion of the first pulley and also receiving a remaining portion of the second pulley and an open position allowing access to the first and second pulleys, with the guard half being secured relative to the second guard quarter to prevent the second guard quarter from being moved from the guard position to the success position when the guard half is secured relative to the second guard quarter.

11. The rotary cutter of claim 1 further comprising, in combination: a first element rotatable about a first axis, with the axis of the cutter head being a second axis spaced from and parallel to the first axis; and an assemblage rotatably interconnecting the first element and the cutter head, comprising, in combination: a planar mount extending generally tangential to the cutter head and spaced from the second axis; a cover including a first wall spaced from the planar mount and opposite of the second axis than the planar mount, with the cover further including a second wall extending from the first wall, with the cover being pivotal between an enclosure position and an access position, with the first and second walls and the planar mount defining an enclosure for the cutter head in the closed position and the second wall being spaced from the planar mount in the access position to allow access to the cutter head; and a guard receiving the assemblage and pivotal about a fourth axis between a guard position and an open position, with the guard in the guard position preventing the cover from pivoting from the enclosure position and allowing the cover to pivot from the enclosure position to the access position in the open position.

12. A rotary cutter for a die comprising, in combination: a cutter head adapted to be rotated about an axis relative to the die; at least a first blade holder extending radially from the cutter head; a knife including an aperture, with the blade holder including a knife support surface; and a groove formed in one of the knife and the knife support surface, with the knife being restrained to slide along a single slide direction parallel to the knife support surface, with the blade holder including a detent for receipt in the aperture for selectively preventing sliding of the knife parallel to the support surface along the single slide direction, and with the knife being flexible to remove the detent from the aperture by receipt of a tool in the groove and between the knife and the knife support surface.

13. The rotary cutter of claim 12 with the detent being integrally formed as a single component with the knife support surface.

14. The rotary cutter of claim 13 with the detent including an inclined surface extending at a small acute angle to the knife support surface terminating in a stop surface extending generally perpendicular to the knife support surface.

15. The rotary cutter of claim 14 with the knife including a cutting edge, a rear edge, and first and second side edges, with the aperture being spaced from the cutting, rear, and side edges.

16. The rotary cutter of claim 15 further comprising, in combination: shoulders extending from opposite edges of the knife support surface and spaced from the knife support surface for slideable receipt of the knife parallel to the knife support surface.

17. The rotary cutter of claim 12 further comprising, in combination: a first element rotatable about a first axis, with the axis of the cutter head being a second axis spaced from and parallel to the first axis; and an assemblage rotatably interconnecting the first element and the cutter head, comprising, in combination: a planar mount extending generally tangential to the cutter head and spaced from the second axis; a cover including a first wall spaced from the planar mount and opposite of the second axis than the planar mount, with the cover further including a second wall extending from the first wall, with the cover being pivotal between an enclosure position and an access position, with the first and second walls and the planar mount defining an enclosure for the cutter head in the closed position and the second wall being spaced from the planar mount in the access position to allow access to the cutter head; and a guard receiving the assemblage and pivotal about a fourth axis between a guard position and an open position, with the guard in the guard position preventing the cover from pivoting from the enclosure position and allowing the cover to pivot from the enclosure position to the access position in the open position.

18. The rotary cutter of claim 17 with the second wall including an opening through which a portion of the assemblage can extend in the guard position, with the cutter head including a plate rotatable about the second axis with the cutter head and of a size larger than the opening.

19. The rotary cutter of claim 18 with the cover further including a receptacle formed on the second wall for receiving the assemblage, with the guard being pivotal relative to the receptacle, with the receptacle and the guard enclosing the assemblage in the enclosure position and the guard position and allowing access to the assemblage in the open position.

20. The rotary cutter of claim 19 with the assemblage including a first pulley connected to the first element, a second pulley connected to the cutter head, and a continuous, flaccid member extending between the first and second pulleys, with the second pulley extending through the opening in the enclosure position.

21. The rotary cutter of claim 20 further comprising, in combination: an idler secured to the guard and adapted to engage the continuous, flaccid member when the guard is in the guard position and to be disengaged from the continuous, flaccid member when the guard is in the open position.

22. The rotary cutter claim 12 further comprising, in combination: a first element rotatable about a first axis and including a first pulley, a second pulley included on the cutter head, with the axis of the cutter head being a second axis; a continuous, flaccid member extending between the first and second pulleys, with the first and second axes being in a spaced parallel relation; a first guard quarter; a second guard quarter; and a guard half, with the first guard quarter being fixed relative to the first element and receiving a portion of the first pulley and being spaced from the second pulley, with the second guard quarter being movable relative to the cutter head between a guard position receiving a portion of the second pulley and spaced from the first pulley and an access position being spaced from the second pulley, with the guard half being movable relative to the first and second guard quarters between a closed position receiving a remaining portion of the first pulley and also receiving a remaining portion of the second pulley and an open position allowing access to the first and second pulleys, with the guard half being secured relative to the second guard quarter to prevent the second guard quarter from being moved from the guard position to the success position when the guard half is secured relative to the second guard quarter.

23. The rotary cutter of claim 22 further comprising, in combination: an idler secured to the guard half and adapted to engage the continuous, flaccid member when the guard half is located in the closed position.

24. The rotary cutter of claim 23 with the second guard quarter being pivotal about a third axis between the guard position and the access position, with the guard half abutting with the second guard quarter in the guard position.

25. The rotary cutter of claim 24 with the guard half being pivotal about a fourth axis between the closed position and the open position, with the fourth axis being perpendicular to the third axis.

26. The rotary cutter of claim 25 with the fourth axis being parallel to and spaced from the first and second axes.

27. The rotary cutter of claim 26 further comprising, in combination: a cover pivotable out the third axes, with the second guard quarter being secured to the cover, with the cover including an opening through which the second pulley extends in the guard position, with the guard half in the closed position abutting with the cover in the guard position to prevent pivoting of the cover about the third axis.

28. The rotary cutter of claim 27 further comprising, in combination: a plate adapted to be rotatable with the cutter head and of a size larger than the opening, with the cover located intermediate the plate and the second pulley in the guard position.

29. The rotary cutter of claim 28 further comprising, in combination: a planar mount extending generally tangential to the cutter head and spaced from the second axis, with the cover including a wall extending generally parallel to and spaced from the planar mount and opposite of the second axis than the planar mount, with the planar mount, the plate, the cover and the wall defining an enclosure for the cutter head.

30. A rotary cutter for a die comprising, in combination: a cutter head adapted to be rotated about an axis relative to the die; at least a first blade holder extending radially from the cutter head; a knife including an aperture, with the blade holder including a knife support surface, with the knife being restrained to slide along a single slide direction parallel to the knife support surface, and with the blade holder including a detent for receipt in the aperture for selectively preventing sliding of the knife parallel to the support surface along the single slide direction, with the detent being integrally formed as a single component with the knife support surface.

31. The rotary cutter of claim 30 with the detent including an inclined surface extending at a small acute angle to the knife support surface terminating in a stop surface extending generally perpendicular to the knife support surface.

32. The rotary cutter of claim 31 with the knife including a cutting edge, a rear edge, and first and second side edges, with the aperture being spaced from the cutting, rear, and side edges.

33. The rotary cutter of claim 32 further comprising, in combination: shoulders extending from opposite edges of the knife support surface and spaced from the knife support surface for slideable receipt of the knife parallel to the knife support surface.

* * * * *